United States Patent [19]

Gutjahr et al.

[11] Patent Number: 5,441,637
[45] Date of Patent: Aug. 15, 1995

[54] SUCTION HEAD FILTER FOR A FUEL TANK

[75] Inventors: Kurt Gutjahr, Waiblingen; Hansjörg Bossler, Backnang, both of Germany

[73] Assignee: Andreas Stihl, Waiblingen, Germany

[21] Appl. No.: 144,788

[22] Filed: Oct. 29, 1993

[30] Foreign Application Priority Data

Oct. 29, 1992 [DE] Germany .................. 42 36 490.6

[51] Int. Cl.6 ............................................. B01D 35/02
[52] U.S. Cl. ...................................... 210/232; 210/172; 210/315; 210/316; 210/455; 210/457; 210/461; 210/463; 210/485; 210/487; 210/489; 210/496; 210/510.1
[58] Field of Search ............ 210/172, 315, 455, 461, 210/484, 485, 489, 496, 499, 510.1, 463, 487, 316, 318, 457, 460, 232; 220/306

[56] References Cited

U.S. PATENT DOCUMENTS 3,744,640  7/1973  Grover .......................... 210/172
4,411,788 10/1983  Kimura ......................... 210/460
4,555,042 11/1985  Rathbun ........................ 220/306
4,645,600  2/1987  Filippi .......................... 210/484
4,851,118  7/1989  Kurihara ....................... 210/315
5,022,986  6/1991  Lang ............................ 210/455

FOREIGN PATENT DOCUMENTS 1503343  3/1978  United Kingdom ............. 210/172

Primary Examiner—Matthew O. Savage
Attorney, Agent, or Firm—Robert W. Becker & Associates

[57] ABSTRACT

A suction head for a fuel line of a fuel tank, especially for hand-held working tools such as motor chainsaws, has a cup-shaped housing made of plastic and comprising a mantle wall with cutouts and an end face with an opening. A filter mesh is covering the cutouts. A filter insert is inserted into the housing through the opening in the end face. A cap made of plastic and having a connector for the fuel line is sealingly connected to the end face with the opening.

19 Claims, 3 Drawing Sheets

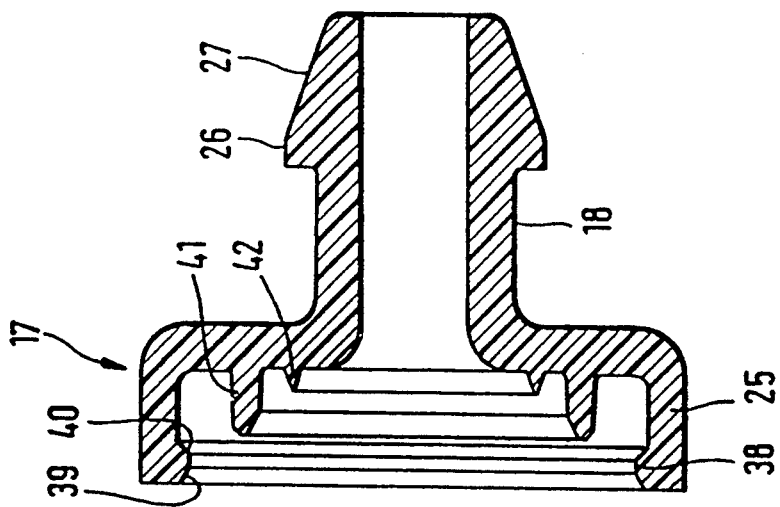
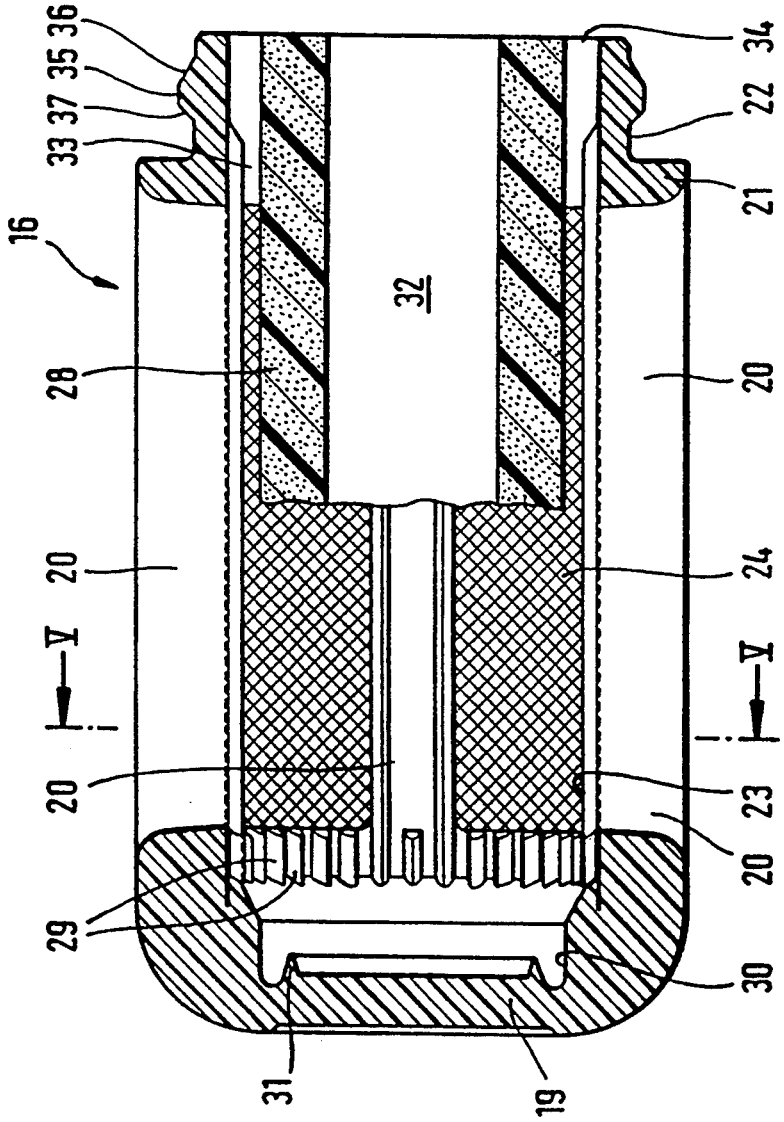

SUCTION HEAD FILTER FOR A FUEL TANK

BACKGROUND OF THE INVENTION

The present invention relates to a suction head for a fuel line of a fuel tank, especially for hand-held working tools, such as motor chainsaws, whereby the suction head comprises a plastic housing, a filter element that is inserted into the housing through an opening in the end face of the housing, and a fuel line connector. The mantle wall of the housing is provided with cutouts which are covered by a filter mesh. The opening in the end face of the housing is sealingly closed by a cap.

A suction head for a fuel line of a fuel tank is known where the suction head is comprised of a housing made of a plastic material that has a fuel line connector as an integral part. At the end face of the housing remote from the fuel line connector the opening for inserting the filter element is provided. The mantle wall of the housing is provided with a plurality of cutouts which are covered by a filter mesh that has the function of a first filter element. The filter insert is comprised of a foam rubber body that initially has greater dimensions than the volume of the housing and is pressed into the housing for assembly. The foam rubber body thus is in close contact with the entire circumferential inner surface of the filter mesh in order to provide a secure positioning within the housing and furthermore to prevent fuel flow along the sides of the foam rubber body. The opening for inserting the foam rubber body is closed by a rubber cap so that no fuel can enter into the interior of the housing via the insert opening. In order to ensure that the suction head is at all times submerged in the fuel, the cap of the housing is provided with a lead weight.

Since different working tools are provided with different fuel lines, the connectors for the fuel lines are also different. This means that for different suction heads different connectors must be provided. Furthermore, a rubber cap is needed for closing the insert opening for inserting the filter element that due to the high requirements with respect to the quality of the rubber material is accordingly very expensive.

It is therefore an object of the present invention to provide a suction head of the aforementioned kind that is universally useable and that is less expensive to manufacture.

BRIEF DESCRIPTION OF THE DRAWINGS

This object, and other objects and advantages of the present invention, will appear more clearly from the following specification in conjunction with the accompanying drawings, in which:

FIG. 3 shows a longitudinal section of the housing of the suction head, in part also showing the inserted filter;

FIG. 4 shows a section of the cap with connector; and

SUMMARY OF THE INVENTION

Figure 1:
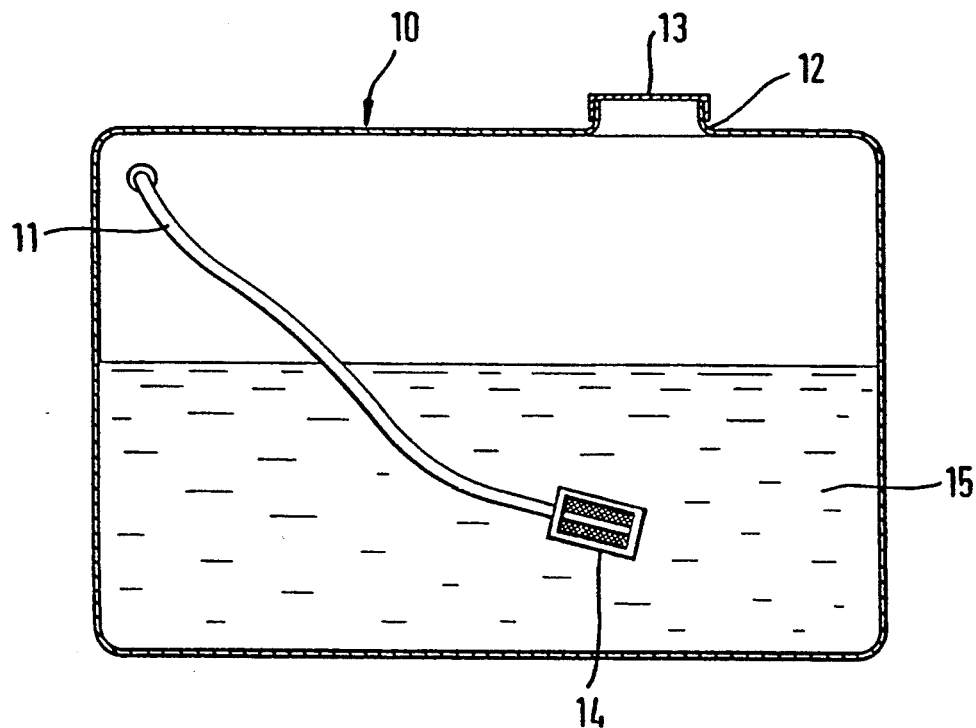
FIG. 1 is a schematic representation of a section of a fuel tank.

The suction head for a fuel line of a fuel tank according to the present invention is primarily characterized by:

A cup-shaped housing made of plastic comprising a mantle wall with cutouts and an end face with an opening;

A filter mesh for covering the cutouts;

A filter insert inserted into the housing through the opening; and

A cap made of plastic and having a connector for a fuel line, the cap sealingly connected to the end face with the opening.

The end face of the housing has a sleeve-shaped extension for receiving the cap, the sleeve-shaped extension having a radially outwardly extending bead. Preferably, the cap has a cylindrical section remote from the connector, the cylindrical section having a radially inwardly projecting bead that, when the cap is mounted on the housing, engages behind the radially outwardly extending bead of the sleeve-shaped extension for interlocking the cap and the housing.

The radially outwardly extending bead has a conical segment facing the cap. The angle of an outer surface of the conical segment to the longitudinal axis of the housing is substantially 30°.

The radially outwardly extending bead has a slanted surface engaged by the radially inwardly projecting bead.

Expediently, the radially outwardly extending bead has a first slanted surface and the radially inwardly projecting bead has a second slanted surface, the first and the second slanted surfaces abutting at one another for interlocking.

Preferably, the radially inwardly projecting bead has a conical segment facing the housing, wherein an angle of an outer surface of the conical segment to the longitudinal axis of the housing is substantially 30°.

Expediently, the radially inwardly projecting bead has a slanted surface engaged by the radially outwardly extending bead.

The cap within the cylindrical section has an inner axially extending annular projection 41 for engaging a free end of the filter insert.

The cap preferably has an inner axially projecting annulus for projecting into and engaging the filter insert. Preferably, the inner axially projecting annulus has a projecting tip formed with an angle of substantially 40°.

In a preferred embodiment of the present invention, the filter insert is made of a sintered material and is secured within the housing such that at all times a space is maintained between the filter insert and the filter mesh. The sintered material is preferably sintered plastic and, more preferred, sintered polyethylene having a pore size of substantially 80 μm.

In a preferred embodiment of the present invention, the filter insert is a sleeve having a central hollow interior that is in flow connection with the connector.

Advantageously, the housing has a bottom opposite the end face, the bottom having an inwardly positioned cylindrical recess having a diameter that corresponds to an outer diameter of the filter insert. Preferably, the bottom has an inner axially extending annulus for projecting into and engaging the filter insert. The inner axially extending annulus has a projecting tip formed with an angle of substantially 40°.

The connector preferably has a radial outer projection with a tapered cone frustum-shaped receiving portion for the fuel line.

The main advantages of the present invention are that, independent of the kind and shape of the fuel line in the form of a correspondingly dimensioned fuel hose, at all times the same housing with filter insert can be used and the only required adaptation is the provision of a cap that is adapted to the corresponding fuel hose. The cap preferably is comprised of the same material as the housing, preferably polyamide, which with respect to tightness and stiffness satisfies the requirements and is furthermore inexpensive.

According to a preferred embodiment of the suction head, the housing for receiving the cap is provided with a sleeve-shaped extension having a radially outwardly extending bead. The sleeve-shaped extension provides the seat for the cap, and the bead has a sealing as well as a securing function. In this context it is especially advantageous that the cap is provided with a cylindrical section having at its forward end facing the housing a radially inwardly projecting bead that, when the cap is mounted on the housing, engages behind the radially outwardly extending bead of the sleeve-shaped extension to thereby achieve interlocking of cap and housing. With this measure the number of sealing surfaces is increased, but also a form-locking connection of the interlocking beads is provided so that an accidental removal of the cap from the housing is impossible.

For facilitating mounting of the cap onto the sleeve-shaped extension of the housing it is expedient that the bead at the housing and/or the bead at the cap in the direction of mounting are provided with a conical segment, whereby an angle of the conical segment relative to the longitudinal axis of the housing is approximately 30°. Due to these features it is ensured that the temporary radial widening of the cylindrical section of the cap takes place slowly so that the tension within the material is limited. As soon as the bead of the cap has slipped over the bead at the housing, a radially oriented reshaping into the original state takes place due to the elasticity of the material. It may well be desired that the cap be removable from the housing in a simple manner. For this purpose it is advantageous that at least one of the beads of the interlocking system are provided with a slanted surface. It is especially advantageous that both beads are provided with a slanted surface having preferably an angle relative to the longitudinal axis of the housing of 45°.

A further embodiment of the inventive suction head suggests that the connector for the fuel line has a radial outer projection with a tapered cone frustum-shaped receiving portion for the fuel line. The tapered cone frustum-shaped receiving portion facilitates slipping of the fuel line, i.e. the hose, onto the connector, and the radial projection provides for a sufficient compression fit. Since the material of the hose is elastic and will contract behind the radial projection, the undercut of the radial projection provides for additional holding forces. A further embodiment of the inventive suction head suggests that the filter insert is comprised of a sintered material and is secured within the housing in its position such that at all times a distance between filter insert and filter mesh is maintained. A filter insert made of sintered material has the advantage that in the plurality of pores a certain amount of fuel may be stored, but that the sintered material is completely impermeable to air. In this manner, the fuel supply for the drive motor is secured for a certain amount of time, even when the suction head due to abrupt movement of the working tool is momentarily removed from the fuel volume. The distance between the filter insert and the filter mesh has the further advantage that small dirt particles, which may pass through the narrow openings of the filter mesh, are retained in the space between the filter mesh and the filter insert without impairing fuel flow through the sintered material. An especially suitable material for the filter insert is sintered plastic material, whereby especially polyethylene of a pore size of approximately 80 μm is suitable.

In a preferred embodiment of the present invention, the filter insert has the shape of a sleeve with a central hollow interior that is in flow connection with the connector for the fuel line. This shape of the filter insert is best adapted to the cup-shaped housing of the suction head and is also especially easy to mount. For providing a secure positioning of the filter insert within the cup-shaped housing, the housing is provided with a cylindrical recess at its bottom that has a diameter corresponding to the outer diameter of the filter insert. Since it is furthermore advantageous to secure the filter insert also within the cap, an inner axially extending annular projection for engaging the outer portion of the free end of the filter insert is provided within the cylindrical section of the cap. In order to prevent flow of fuel along the end face of the filter insert from the outer mantle surface of the filter insert to the inner hollow interior, an inner axially projecting annulus is provided at the end face of the housing and/or of the cap for sealing this passage which projects into and engages the filter insert. It is especially advantageous that the annulus has a triangular cross-section whereby the projecting tip is formed with an angle of preferably approximately 40°.

DESCRIPTION OF THE PREFERRED EMBODIMENTS

The present invention will now be described in detail with the aid of several specific embodiments utilizing FIGS. 1 through 5.

FIG. 1 shows a fuel tank 10 having a filling socket 12 with a tank lid 13 connected thereto. A fuel hose 11 extends into the fuel tank 10 and has at its free end a suction head 14 connected thereto. The suction head 14 is submerged with a portion of the fuel hose 11 in the fuel 15 contained in the tank 10.

Figure 2:
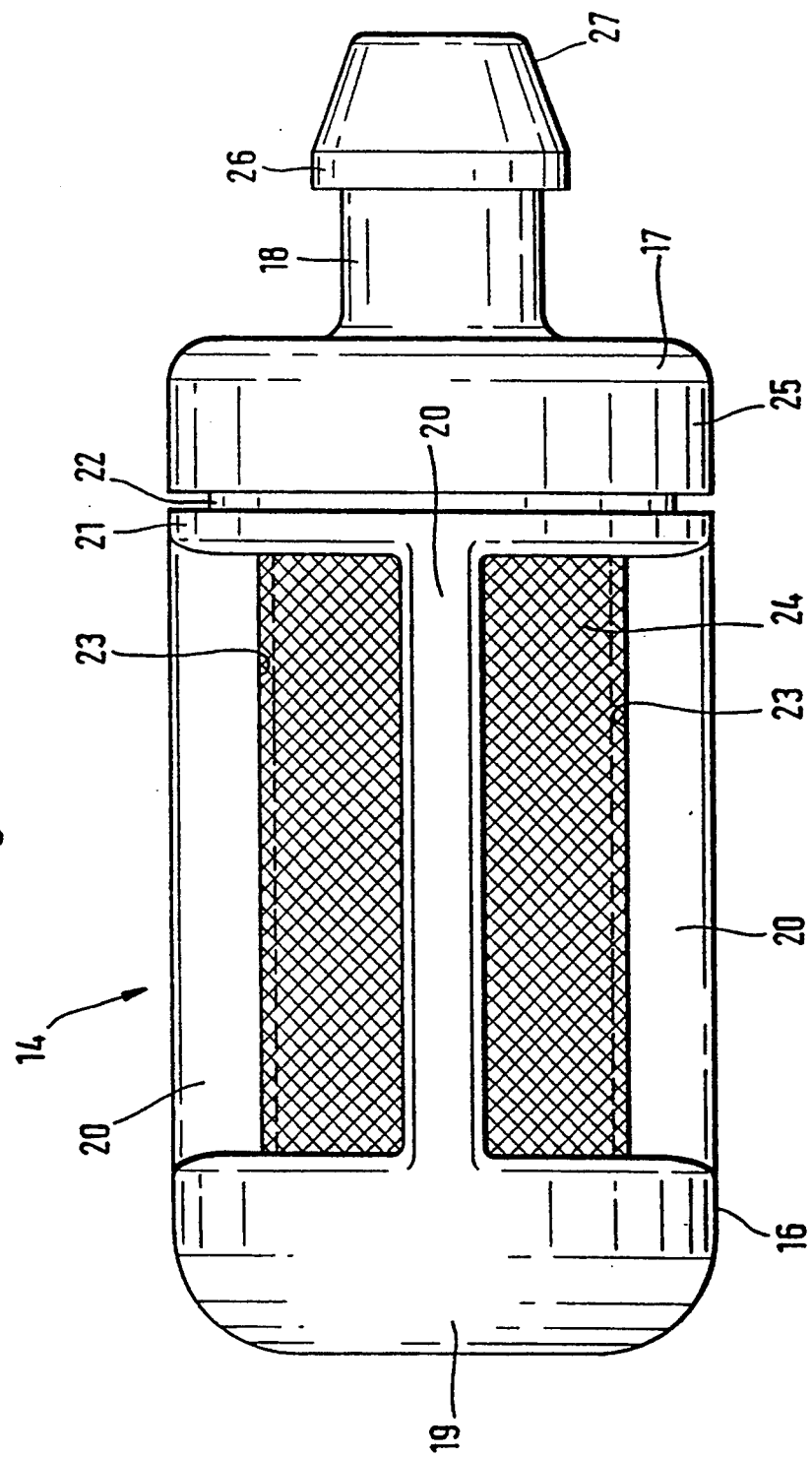
FIG. 2 shows a suction head of the present invention in an enlarged representation.

FIG. 2 shows an enlarged representation of the suction head 14. The suction head 14 is comprised essentially of a cup-shaped housing 16 and a cap 17 which closes off one end face of the housing. The cap 17 has a connector 18 for the fuel line as an integral part. The housing 16 as well as the cap 17 are made of polyamide. From the closed end face of the housing 16 in the form of the bottom 19 stays 20 extending in the axial direction toward the other end face are provided. The latter end face is comprised of a collar 21 and a sleeve-shaped extension 22. Between the stays 20 the mantle wall of the housing 16 has cutouts 23 which are covered by a filter mesh 24 which is especially in the form of a plastic mesh. The cap 17 has a cylindrical section 25 which is slipped onto the sleeve-shaped extension 22 of the housing 16 and attached thereto in a sealing manner. At the forward end of the connector 18 a radial projection 26 is provided which toward its free end is provided with a tapered cone frustum-shaped receiving portion 27 for the fuel line 11.

FIG. 3 shows a longitudinal section of the housing 16 in the same scale as FIG. 2. In this representation the cup-shaped form defined by the bottom 19 and the stays 20 can be seen. In the left half of FIG. 3 the housing 16 is shown without the filter insert, while in the right half of the drawing the filter insert 28 is represented.

From the left half of FIG. 3 it may be taken that the filter mesh 24 is also held in place on the inside of the housing 16 by the stays 20 and that a plurality of projections 29 of the plastic material is provided at the inside adjacent to the bottom 19 for ensuring that sufficient plastic material is provided to securely hold the filter mesh 24 in place. The inwardly positioned portion of the bottom 19 is provided with a cylindrical recess 30 having a diameter corresponding to the outer diameter of the filter insert 28 so that the mounted filter insert 28 is radially secured. Furthermore, the bottom 19 is provided with an inner axially extending annulus 31 having in cross-section the shape of a triangle. This annulus 31 serves to penetrate the end face of the filter insert 28. The tip of the annulus 31 has an angle of approximately 40°.

The right half of FIG. 3 shows the filter insert 28 within the housing 16. The filter insert 28 has the shape of a sleeve whereby the hollow interior 32 within the sleeve is in flow connection with the connector 18 represented in FIG. 4. The outer diameter of the filter insert 28 is dimensioned such that a radial distance to the filter mesh 24 is provided over its circumference and thus an annular space 33 is formed between the filter insert 28 and the filter mesh 24. The filter insert 28 is comprised of sintered polyethylene with a pore size of 80 μm. The housing 16 has a collar 21 at its end face facing the cap 17 and a sleeve-shaped extension 22 that forms an opening 34 for insertion of the filter insert 28.

The sleeve-shaped extension 22 serves for receiving the cap 17 whereby for securing the cap 17 the extension 22 has a radially outwardly projecting bead 35 that is provided with a conical segment 36 facing the cap 17. The angle of the conical segment 36 with the longitudinal axis of the housing 16 in the shown embodiment is 30°; however, other variations with other angles are also possible. The bead 35 with its side 37 facing the collar 21 serves to engage the cap 17 and interlock cap and housing. The side 37 of the bead 35 is a slanted surface having an angle of 45° to the longitudinal axis of the housing 16.

FIG. 4 shows a section of cap 17 comprising as an integral part the connector 18 for the fuel line and the cylindrical section 25 which is slipped over the sleeve-shaped extension 22 of the housing 16. At the forward end of the cylindrical section 25 a bead 38 extending radially inwardly is provided which, in the direction of mounting of the cap 17, in the same manner as the bead 35 at the extension 22, has a conical segment 39 having an angle corresponding to the angle of the conical segment 36. The side 40 of the bead 38 is also provided as a slanted surface whereby the angle is 45° relative to the longitudinal axis of the housing. The relatively small angle of the conical segments 36 and 39 allow for a slow expansion of the cylindrical segment 25 so that the material tension is limited and the mounting of the cap is facilitated. The angles of the two slanted surfaces 37 and 40 are greater than the angles of the segments 36, 39 and thus secure the cap 17 on the sleeve-shaped extension 22.

At the inner surface, facing the housing 16, of the cap 17 an inner axially extending annular projection 41 extends parallel to the cylindrical section 25. The inner diameter of the projection 41 corresponds to the outer diameter of the filter insert 28 so that the projection engages the end face of the filter insert 28. In the same manner as the bottom 19 of the housing 16 is provided with an annulus 31, the cap 17 has an annulus 42 with a triangular cross-section which is designed for sealingly engaging the material of the filter insert 28. The radial projection 26 with the receiving portion 27 has been described above in connection with FIG. 2.

Figure 5:
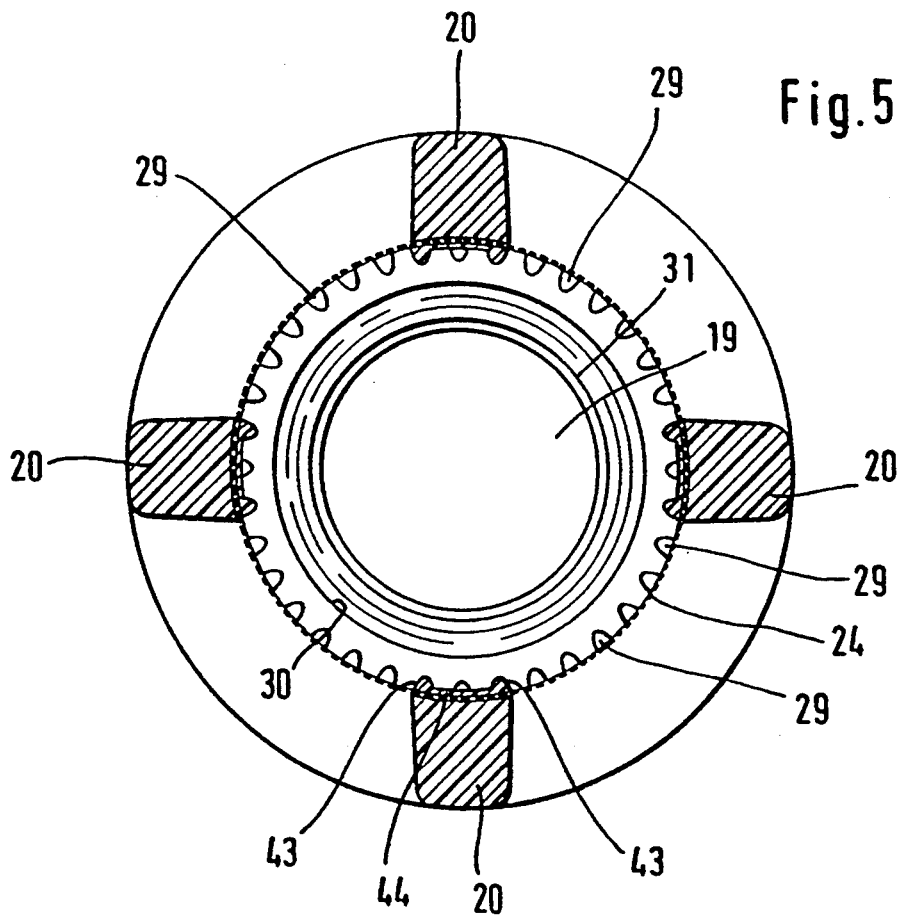
FIG. 5 shows a section along the line V—V in FIG. 3.

FIG. 5 shows a section along the line V—V of FIG. 3. Identical parts have the same reference numerals as in FIG. 3. It is shown that four axial stays 20 are provided and that the filter mesh 24, which is a first filtering element within the suction head 14, is secured on its inner as well as on its outer side by the stays 20. For this purpose, the inner side of the stays 20 is provided with narrow ribs 43 between which only a thin layer 44 of the material of the stays 20 extends. Accordingly, a forcing of the filter mesh 24 radially inwardly even for a higher flow resistance, for example, when the filter mesh 24 is soiled, is prevented. The projections 29 are distributed over the entire circumference. At the bottom 19 the cylindrical recess 30 and the annular projection 31 are shown.

The present invention is, of course, in no way restricted to the specific disclosure of the specification and drawings, but also encompasses any modifications within the scope of the appended claims.

What we claimed is:

1. A suction head for a fuel line of a fuel tank of a hand-held working tool, said suction head comprising:
    a cup-shaped housing made of plastic comprising a mantle wall with cutouts and an end face with an opening;
    a filter mesh for covering said cutouts;
    a filter insert inserted into said housing through said opening;
    a cap made of plastic and having a connector for a fuel line, said cap sealingly connected to said end face with said opening;
    wherein said filter insert is made of a sintered plastic material and is secured within said housing such that at all times a space is maintained between said filter insert and said filter mesh; and
    said sintered plastic material having a plurality of pores each having a pore size of substantially 80 μm to form a reservoir for storing an amount of fuel such that a fuel supply for the drive motor is secured even when due to an abrupt movement of the working tool said suction head is momentarily removed from the fuel contained within the fuel tank.

2. A suction head according to claim 1, wherein said end face of said housing has a sleeve-shaped extension for receiving said cap, said sleeve-shaped extension having a radially outwardly extending bead.

3. A suction head according to claim 2, wherein said cap has a cylindrical section remote from said connector, said cylindrical section having a radially inwardly projecting bead that, when said cap is mounted on said housing, engages behind said radially outwardly extending bead of said sleeve-shaped extension for interlocking said cap and said housing.

4. A suction head according to claim 3, wherein said radially outwardly extending bead has a conical segment facing said cap.

5. A suction head according to claim 4, wherein an angle of an outer surface of said conical segment to a longitudinal axis of said housing is substantially 30°.

6. A suction head according to claim 3, wherein said radially outwardly extending bead has a slanted surface engaged by said radially inwardly projection bead.

7. A suction head according to claim 3, wherein said radially outwardly extending bead has a first slanted surface and said radially inwardly projecting bead has a second slanted surface, said first and said second slanted surfaces abutting at one another for interlocking.

8. A suction head according to claim 3, wherein said radially inwardly projecting bead has a conical segment facing said housing.

9. A suction head according to claim 8, wherein an angle of an outer surface of said conical segment to a longitudinal axis of said housing is substantially 30°.

10. A suction head according to claim 3, wherein said radially inwardly projecting bead has a slanted surface engaged by said radially outwardly extending bead.

11. A suction head according to claim 3, wherein said cap within said cylindrical section has an inner axially extending annular projection for engaging a free end of said filter insert.

12. A suction head according to claim 3, wherein said cap has an inner axially projecting annulus for projecting into and engaging said filter insert.

13. A suction head according to claim 12, wherein said inner axially projecting annulus has a projecting tip with an angle of substantially 40°.

14. A suction head according to claim 1, wherein said sintered plastic is sintered polyethylene.

15. A suction head according to claim 1, wherein said filter insert is a sleeve having a central hollow interior that is in flow connection with said connector.

16. A suction head according to claim 1, wherein said housing has a bottom opposite said end face, said bottom having an inwardly positioned cylindrical recess having a diameter that corresponds to an outer diameter of said filter insert.

17. A suction head according to claim 16, wherein said bottom has an inner axially extending annulus for projecting into and engaging said filter insert.

18. A suction head according to claim 17, wherein said inner axially extending annulus has a projecting tip with an angle of substantially 40°.

19. A suction head according to claim 1, wherein said connector has a radial outer projection with a tapered cone frustum-shaped receiving portion for the fuel line.

* * * * *